United States Patent [19]
Yamashita et al.

[11] Patent Number: 5,674,115
[45] Date of Patent: Oct. 7, 1997

[54] APPARATUS FOR GRINDING A MASTER DISC

[75] Inventors: Eiki Yamashita, Kanagawa; Masato Iwai, Tokyo; Kiyohiko Miyahara; Junzo Takano, both of Kanagawa, all of Japan

[73] Assignee: Sony Corporation, Tokyo, Japan

[21] Appl. No.: 498,156

[22] Filed: Jul. 5, 1995

[30] Foreign Application Priority Data

Jul. 6, 1994 [JP] Japan .................................. 6-154076
Aug. 1, 1994 [JP] Japan .................................. 6-197178

[51] Int. Cl.⁶ .................................................. B24B 29/00
[52] U.S. Cl. ...................... 451/289; 451/63; 451/285; 451/286; 451/388
[58] Field of Search ............................. 451/285–289, 451/388, 449, 63, 441, 413, 398, 41, 43, 292; 15/21.1

[56] References Cited

U.S. PATENT DOCUMENTS

| | | | |
|---|---|---|---|
| 4,393,628 | 7/1983 | Ottman et al. | 451/63 |
| 4,597,228 | 7/1986 | Koyoma et al. | 451/289 |
| 4,603,867 | 8/1986 | Babb et al. | 451/388 |
| 5,357,304 | 10/1994 | Wakamiya et al. | 354/298 |
| 5,421,768 | 6/1995 | Fujiwara et al. | 451/286 |
| 5,421,769 | 6/1995 | Schultz et al. | 451/285 |
| 5,485,644 | 1/1996 | Shinbara et al. | 15/21.1 |
| 5,545,076 | 8/1996 | Yun et al. | 451/287 |

FOREIGN PATENT DOCUMENTS 5-166232  7/1993  Japan .

*Primary Examiner*—Robert A. Rose
*Assistant Examiner*—George Nguyen
*Attorney, Agent, or Firm*—Pasquale Musacchio; Jerry A. Miller

[57] ABSTRACT

The apparatus is to be reduced in size and consumption of utility items is to be decreased, while the connection is to be facilitated by the in-line transporting system. The grinding apparatus includes a turntable 21 for securing a glass master disc 30 for rotating the glass master disc 30, a polishing pad 11 caused to bear against the grinding surface of the glass master disc 30 secured to the turntable 21 with a pre-set pressure and a slurry nozzle 14 for supplying the grinding liquid to the grinding surface of the glass master disc 30. The polishing pad 11 is thrust against the glass master disc 30 rotated by rotation of the turntable 21. The glass master disc 30 has its grinding surface ground as the grinding liquid is supplied to the grinding surface.

23 Claims, 9 Drawing Sheets

APPARATUS FOR GRINDING A MASTER DISC

FIELD OF THE INVENTION

This invention relates to a grinding apparatus for grinding a master disc, and more particularly, to a grinding apparatus having front and back surface nozzles for discharging pure water for cleaning grinding and back surfaces, respectively of a glass master disc.

BACKGROUND OF THE INVENTION

There exist several types of optical discs. These include a play-only optical disc, known as CD or LD, both of which are trade marks, a once-write type optical disc, known as MO, WO or phase-transition type optical disc and an over writable optical disc. With a replay-only optical disc, speech and video signals are recorded as extremely small-sized bits which are 0.11 μm in depth, 0.4 μm in width and 0.55 to 3.56 μm in length.

With the once-write type optical disc and the over writable optical disc, in which signals are recorded by the user, guide grooves for tracking during signal recording and signal reproduction and pits for recording the address information or disc types are formed on the disc. These pits or grooves are usually transcribed on a transparent substrate by an injection molding method employing a nickel die mold known as a stamper or by a signal transcribing method, known as a 2P method, employing UV curable resin. The process for fabrication of the stamper is typically known as a mastering process.

The stamper is fabricated by sequentially carrying out a pre-process which includes rinsing a glass master disc, a resist process for forming a resist layer on the glass master disc, a cutting process using laser light exposure, a development process, a nickel electrocasting process and a post-process of rinsing the finished stamper. After completion of the stamper, the glass master disc is regenerated for re-utilization in the above-described process.

During the polishing process, which is a pre-process of the above processes, it is desirable that a signal surface of the glass master disc be polished smooth before a resist layer is subsequently formed on the glass master disc. For polishing, a grinding device is employed. Referring to FIGS. 7 and 8, an example of a grinding device 100, such as that manufactured by SPEED FAM. CO. LTD. and designated as Model No. 36GPAW, is shown. The grinding device 100 includes a main body 101 having a disc-shaped grinding mandrel 102, a work holding member 103 for holding the glass master disc and pressing the glass master disc onto the grinding mandrel 102, an abrasive supply unit 104 for supplying an abrasive liquid to the grinding mandrel 102 and a pure water supply unit 105 for supplying pure water. With the grinding device 100, plural glass master plates can be ground simultaneously.

Referring to FIG. 9 in conjunction with FIGS. 7 and 8, the grinding mandrel 102 includes a top surface 112. Further, the grinding mandrel 102 is secured to a spindle 107 mounted on a motor 106 for rotating the spindle 107. The grinding mandrel 102 is fabricated from stainless steel and is disc shaped having a diameter between 650 to 1000 mm. The mandrel 102 is rotated by the motor 106 at a speed between, for example, 50 to 250 rpm. An abrasive pad 108 is secured on the top surface 112 of the grinding mandrel 102. The abrasive pad 108 is used for grinding a signal or grinding surface 118 of a glass master disc 109. Typically, dedicated cooling water (not shown) is used to cool the mandrel 102 during grinding.

The grinding device 100 further includes a supporting arm 111. The work holding member 103 is rotatably mounted on the supporting arm 111. The work holding member 103 includes a pressure plate 110 which holds the glass master disc 109 either manually or mechanically. The work holding member 103 and pressure plate 110 are adapted to thrust the glass master disc 109 and thus grinding surface 118 against the abrasive pad 108 with a pre-set thrusting pressure. As such, the glass master disc 109 is oriented such that the grinding surface 118 faces downward and an opposed back surface of the glass master disc 109 faces upward. By way of example, the glass master disc 109 is thrust on the abrasive pad 108 by pneumatic pressure.

The glass master disc 109 is adapted for being rotated, under the force of friction acting between it and the abrasive pad 108 during rotation of the grinding mandrel 102, in unison with the work holding member 103 rotatably mounted on the supporting arm 111.

The abrasive supply unit 104 includes a first nozzle 114 which is directed towards the abrasive pad 108. The abrasive supply unit 104 furnishes an abrasive liquid, which is prepared by mixing e.g., cerium oxide ($CeO_2$) in water. The abrasive liquid is discharged from the first nozzle 114 onto the abrasive pad 108 by e.g., a pump (not shown). The pure water supply unit 105 includes a second nozzle 116 which is directed towards the abrasive pad 108. The pure water supply unit 105 discharges pure water through the second nozzle 116. The pure water is used for washing abrasive material that is left on the abrasive pad 108 after polishing the grinding surface 118 of the glass master disc 109.

The grinding of the glass master plate 109 by the grinding device 100 is carried out in accordance with the flow chart shown in FIG. 10. At step ST51, the glass master disc 109 is placed on the top surface 112 of the abrasive mandrel 102 and held on the pressure plate 110 so that the grinding surface 118 faces downwards. Air is supplied by the work holding member 103 to thrust the glass master disc 109 and thus the grinding surface 118 onto the abrasive pad 108 with a pressure approximately equal to tens of grams/$cm^2$. Then, at step ST52, the abrasive liquid is supplied through the first nozzle 114 onto the abrasive pad 108.

At step ST53, the abrasive mandrel 102 is rotated for grinding the glass master disc 109. At this time, the glass master disc 109 is rotated in unison with the grinding mandrel 102. Further, the work holding member 103 is adapted to move vertically to accommodate movement of the abrasive mandrel 102 in order to maintain contact between the grinding surface 118 of the glass master disc 109 and the abrasive mandrel 102.

Then, after the grinding of the glass master disc 109 comes to a close at step ST54, the supply of the abrasive liquid is terminated and pure water is furnished for rinsing off any residual abrasive liquid on the abrasive pad 108.

At step ST55, the rotation of the grinding mandrel 102 is terminated and the glass master disc 109 is dismantled. At step ST56, grinding is terminated.

However, such grinding devices have disadvantages. In particular, due the relatively large size of the mandrel 102 (i.e. diameter between 650 and 1000 mm), the grinding device 100 is also relatively large in size. This results in substantial consumption of utility items, such as cooling water, pure water and electric power. In addition, in order to rotate the abrasive mandrel 102 at a speed between 50 to 250 rpm, a relatively large-sized motor is required, thus resulting in substantial power consumption.

Further, during other steps of the mastering process, such as the application of the resist coating, the cutting and development processes and others, the glass master disc 109 is oriented such that the grinding surface 118 faces upward. However, in order to perform the polishing step, the grinding surface 118 must then be turned and oriented downward in a complex motion by a transporting unit used to transport the glass master disc 109. This results in a complicated structure for the transporting unit which is expensive to fabricate and maintain. In addition, since the glass master disc 109 is and the abrasive pad 108 are located within the main body 101 of the grinding device 100, the glass master disc 109 cannot be washed.

A cleaning device which enables washing of a glass substrate having a top and bottom surface is disclosed in Japanese Laid Open Patent No. 5-166232. The cleaning device includes first, second and third nozzles for providing a solvent, water and air, respectively, onto the top surface of a glass substrate. The bottom surface of the glass substrate is vacuum mounted to a stand which is adapted to rotate. A brush is positioned adjacent to the top surface and contacts the top surface. In operation, pure water is discharged from the second nozzle onto the top surface as the glass substrate is rotated so as to wash the substrate. Then, the glass substrate is washed by the pure water and solvent discharged onto the top surface from the first nozzle. Pure air is then discharged from the third nozzle onto the top surface. The glass substrate is then rotated at high speed to dry the substrate. However, a disadvantage with this cleaning device is that only the top surface is washed and cleaned. As a result, contaminants and other undesirable materials which are on the bottom surface are not removed. This increases the likelihood that the bottom surface will be damaged due to the contaminants or other undesirable materials.

In view of the above-mentioned disadvantages, it is an object of the present invention to provide a grinding apparatus which enables the washing and cleaning of the grinding and back surfaces of glass master disc. It is a further object to provide a grinding apparatus which is substantially reduced in size. It is a still further object to provide a grinding apparatus which substantially decreases the mount of water and other utility items that are utilized during the grinding process. Moreover, it is an object of the present invention to provide a grinding apparatus which reduces the complexity of motion for the glass master disc, thus enabling the use of a transporting unit having substantially reduced complexity.

SUMMARY OF THE INVENTION

According to the present invention, there is provided a grinding apparatus for a master disc for an optical disc comprising a turntable to which the master disc for the optical disc is secured and which is adapted for rotating the master disc, an abrasive pad thrust against a grinding surface of the master disc secured on the turntable with a pre-set pressure, and an abrasive liquid supply unit for supplying the abrasive liquid to the grinding surface of the master disc. The abrasive pad is thrust against the master disc for the optical disc rotated by rotation of the turntable and grinding is carried out while the grinding liquid is supplied to the grinding site.

The abrasive pad is rotatably mounted with respect to a supporting member and is rotated with rotation of the master disc for the optical disc under the force of friction with the master disc for the optical disc. Alternatively, the abrasive pad is compulsorily rotated by a rotational driving source with rotation of the master disc for the optical disc.

The turntable employed is of a smaller diameter than the master disc for the optical disc. The master disc for the optical disc is secured to the turntable under vacuum suction.

DETAILED DESCRIPTION OF THE INVENTION

Figure 1:
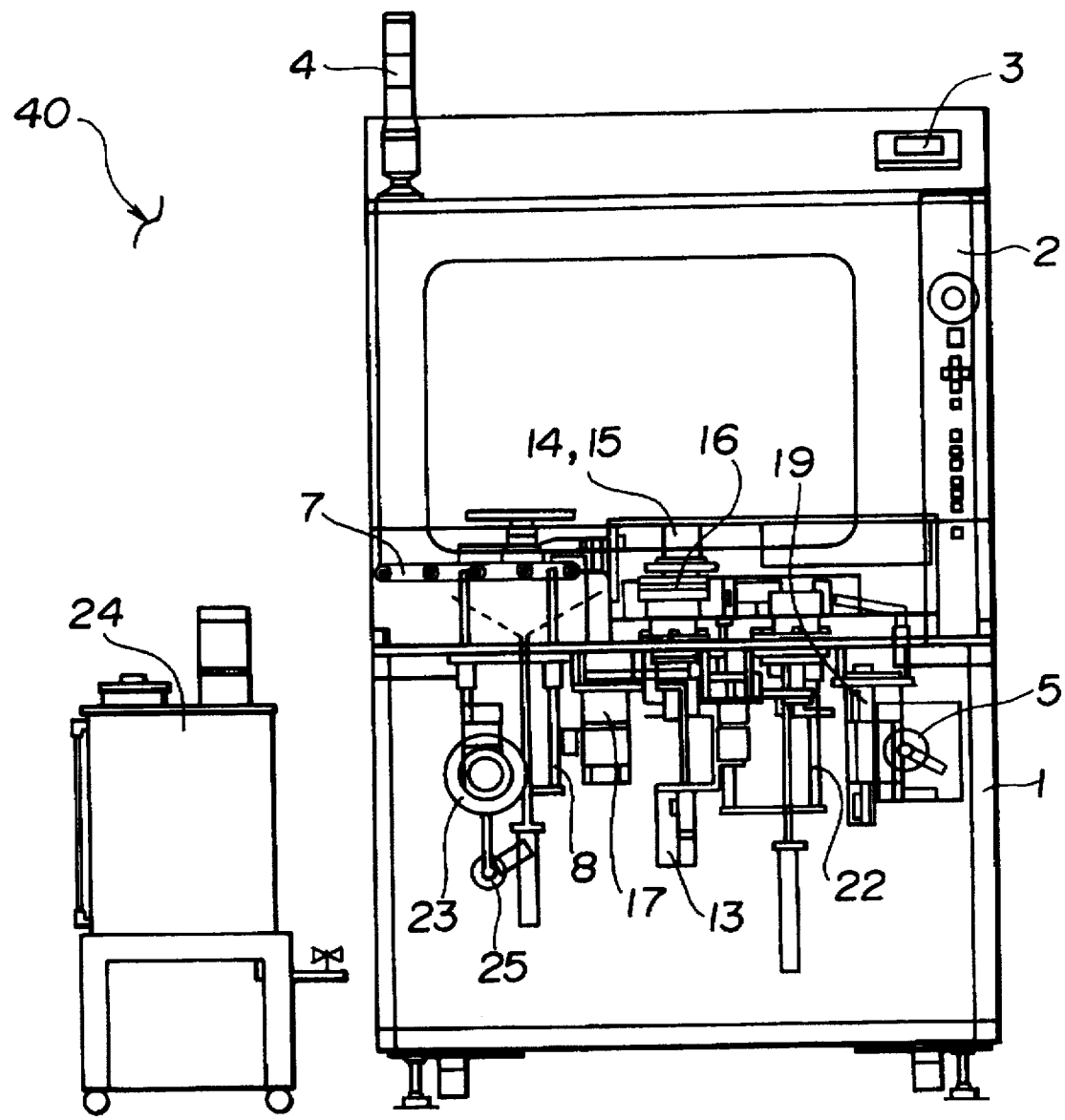
FIG. 1 is a front view showing a grinding apparatus for grinding a glass master disc according to the present invention, with the apparatus being partially broken away for showing the inside thereof.

Referring to the drawings, preferred embodiments of the present invention will be explained in detail.

Figure 6:
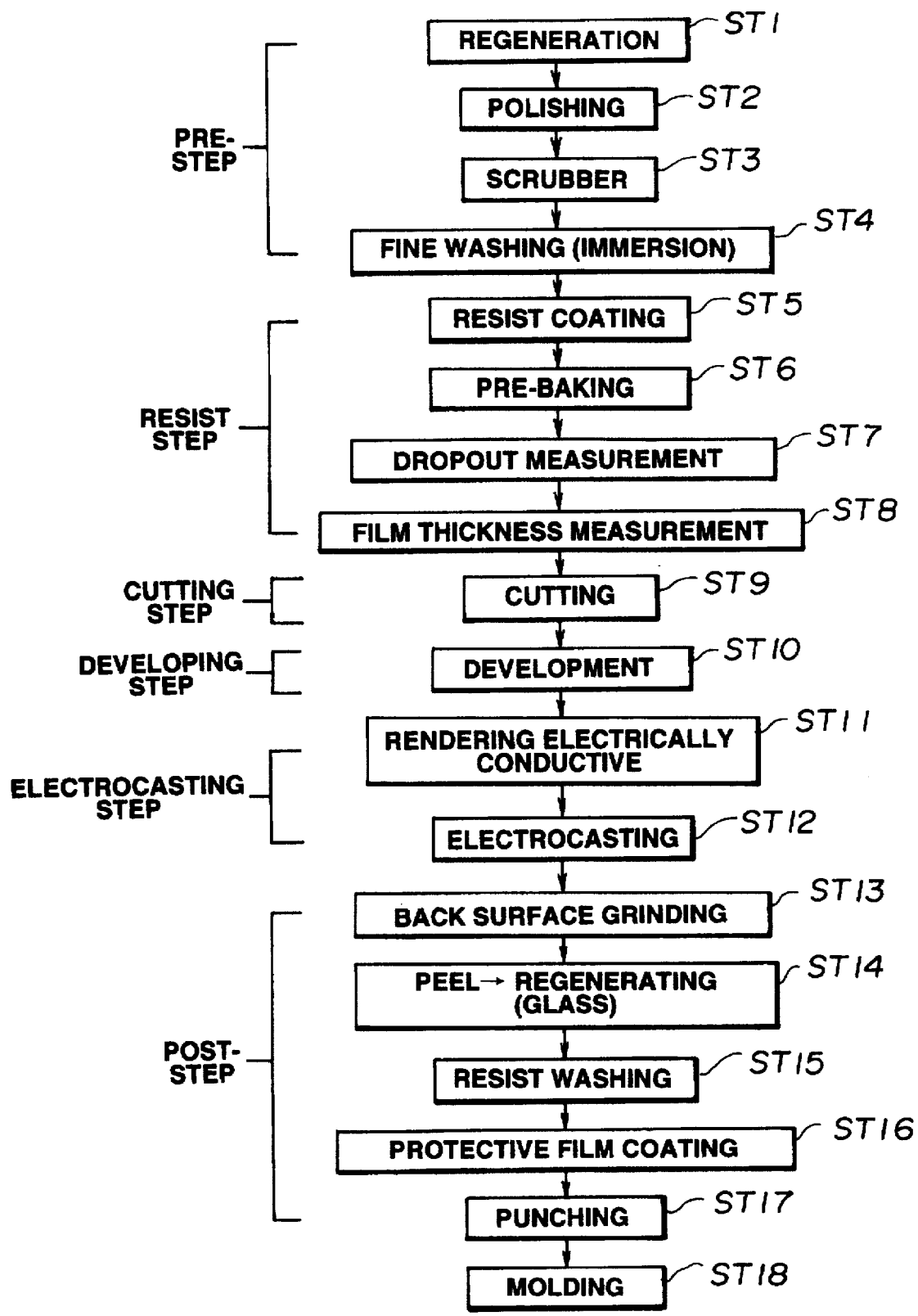
FIG. 6 is a flow chart showing the mastering process for the glass master disc using the grinding apparatus according to the present invention.
Figure 7:
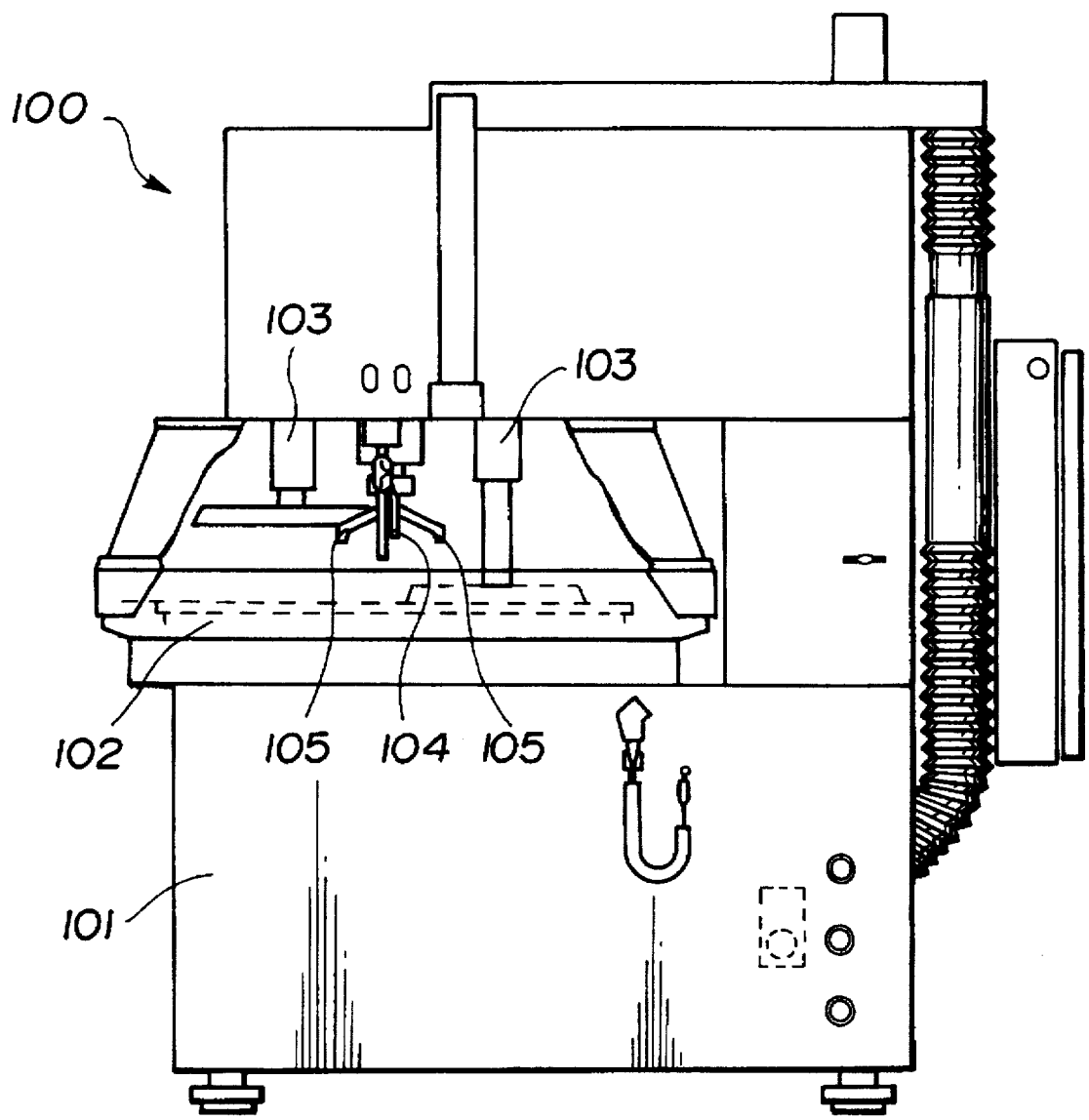
FIG. 7 is a front view showing a conventional grinding apparatus for a glass master disc, partially broken away.
Figure 8:
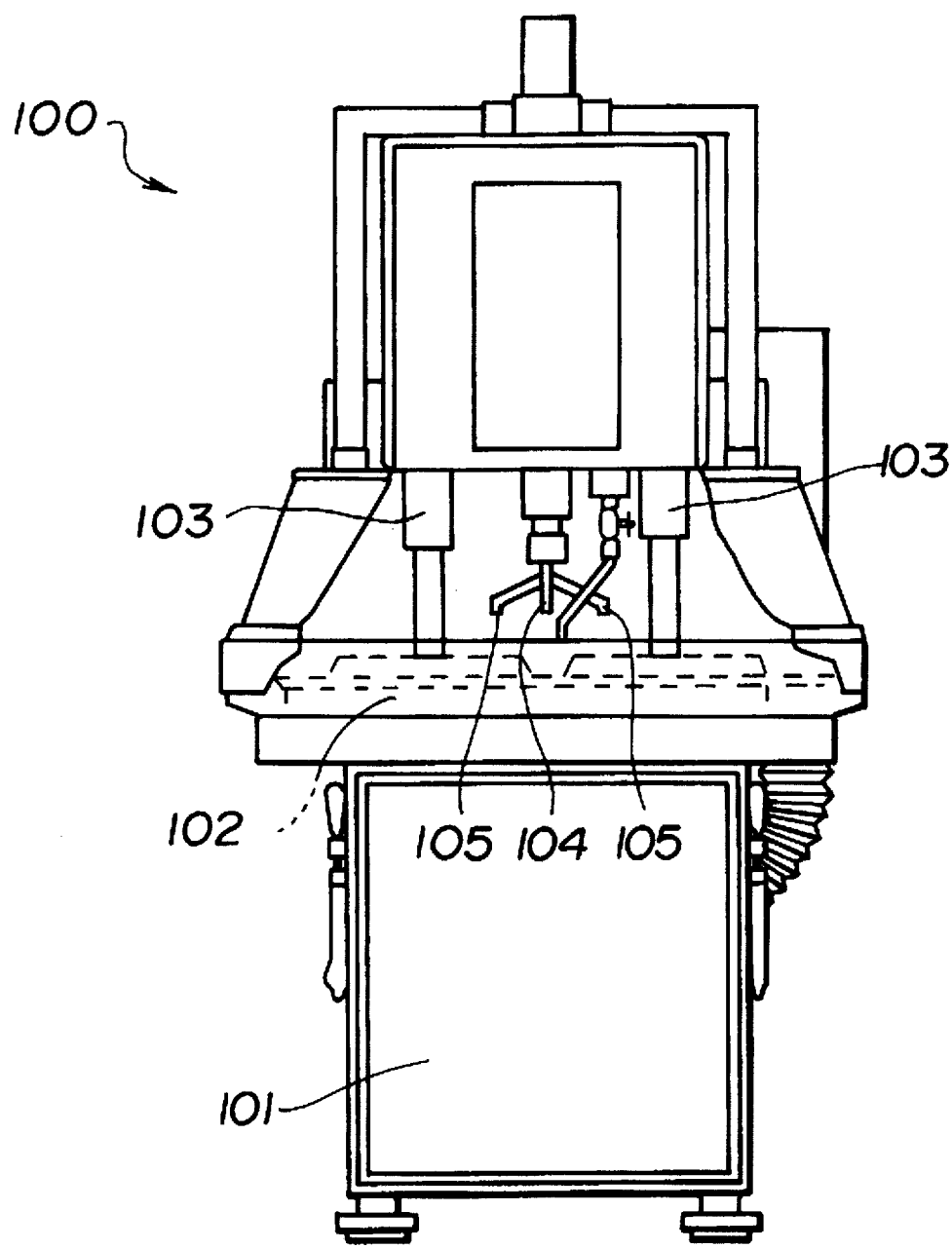
FIG. 8 is a side view showing the conventional grinding apparatus for a glass master disc, partially broken away.
Figure 9:
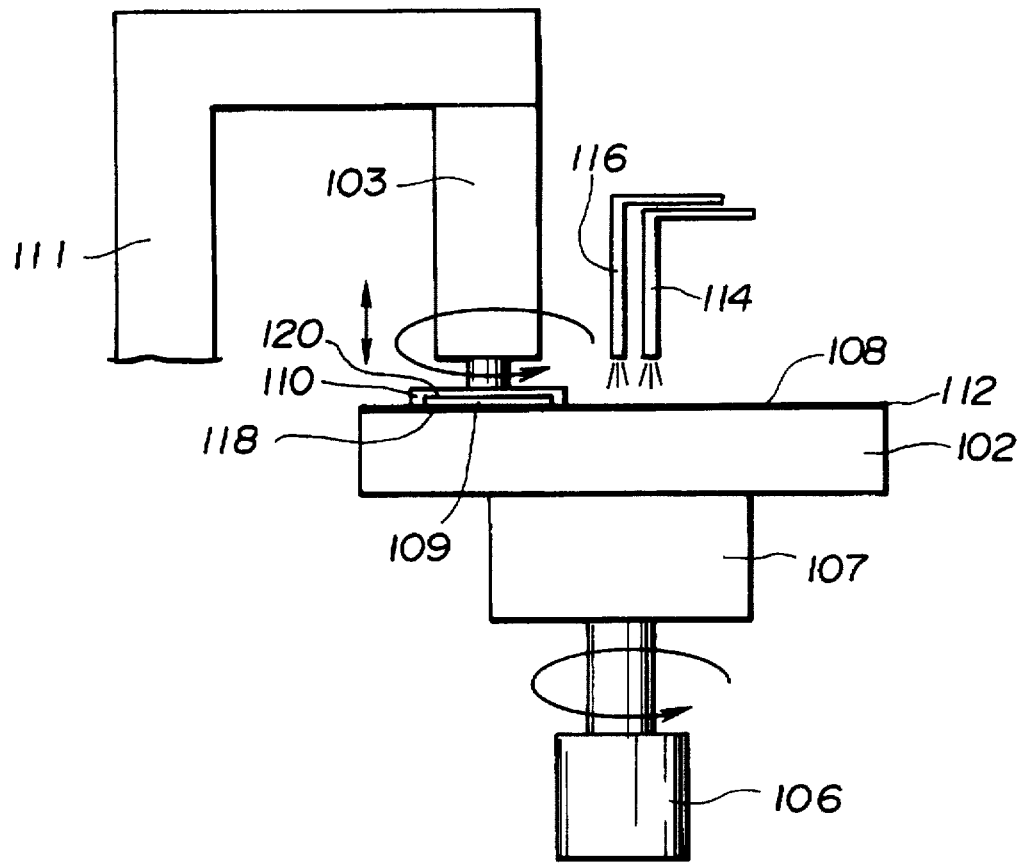
FIG. 9 is a schematic view showing essential portions of a grinding mechanism of the conventional grinding apparatus for a glass master disc.
Figure 10:
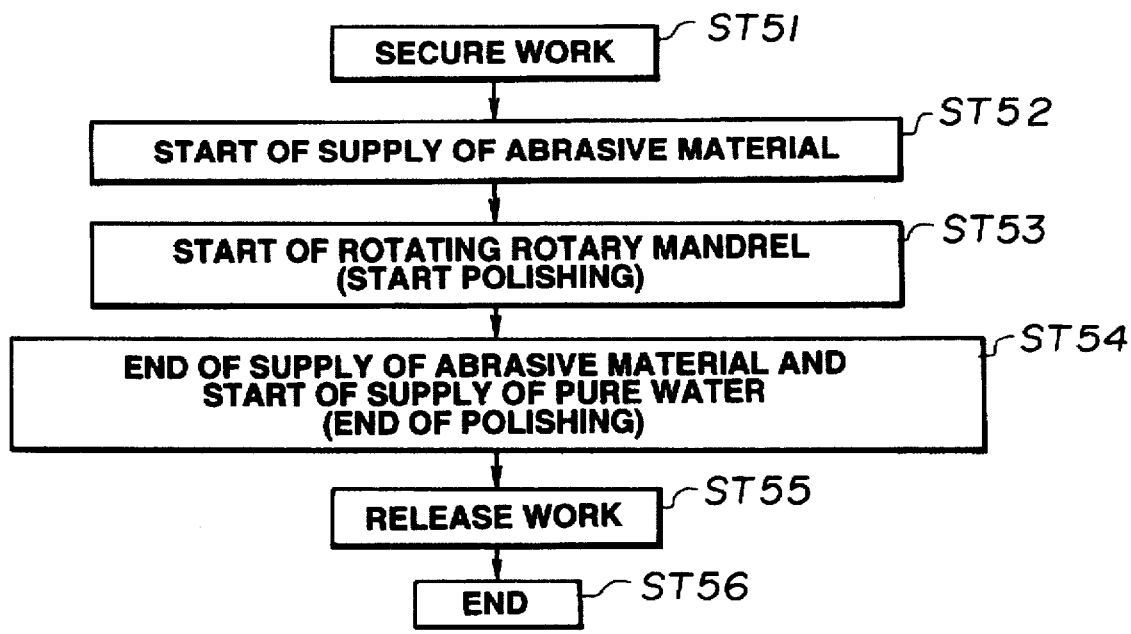
FIG. 10 is a flow chart for illustrating the polishing process by the conventional grinding apparatus for a glass master disc.

Before explaining the grinding apparatus for the master disc of the present embodiment, the mastering process in accordance with the present invention is briefly explained. Mastering is carried out in accordance with a flow chart shown in FIG. 6.

The mastering process is roughly divided into a pre-process, a resist process, a cutting process, a development process, an electrocasting process and a post-process. The pre-process includes regenerating, polishing, scrubbing and fine washing steps. During the pre-process, the regeneration is carried out at step ST1, the polishing is carried out at step ST2, the scrubbing is carried out at step ST3 and finally the fine washing is carried out at step ST4.

The regeneration step ST1 is the processing for enabling re-utilization of the glass master disc employed as a master for an optical disc. With such regeneration, nickel residues and resist residues are removed by ferric nitride and NaOH (or acetone). Both ferric nitride and NaOH are washed off with pure water.

With the polishing step ST2, a dedicated pad is bonded on the turntable and the glass mater disc is placed thereon. The turntable is rotated as the master disc is thrust against the turntable using e.g., an air cylinder. A slurry of cerium oxide is then caused to flow at this time for effecting the grinding. Discharge of cerium oxide is terminated and changed over to discharge of water for removing cerium oxide left on the glass master disc.

The scrubbing step ST3 is carried out for removing cerium oxide residues on the glass master disc by scrubbing.

The fine washing step ST4 is carried out for washing fine residues on the end face and the upper surface of the glass master disc with ultrasonic waves or by dipping in pure water after scrubbing off a major portion of cerium oxide. Detergents may be employed for this step, if desired. The glass master disc is subsequently dried using IPA or pure lukewarm water before being transported to the resist process.

The resist process is sub-divided into a resist coating step, a pre-baking step, a dropout measurement step and a film thickness measurement step. In carrying out the resist step, a resist coating for coating a photo resist on the glass master disc is first carried out at step ST5, and pre-baking for curing the resist is then carried out at step ST6. Dropout measurement and resist film thickness measurement are carried out at the steps ST7 and ST8, respectively.

The cutting process is a process for exposing the resist to a laser beam and is carried out at step ST9 after measurement of the film thickness.

The development process ST10 is a process of developing the resist exposed to light at step ST9.

The electrocasting process includes a step of rendering the master disc electrically conductive at step ST11 and a step of nickel electrocasting at step ST12.

The post-process includes the steps of grinding the back surface, peeling, washing of the resist, coating of a protective film, and punching. For carrying out the post-process, the back surface of the glass master disc is ground at step ST13. The steps of peeling and washing of the resist are carried out at steps ST14 and ST15, respectively. The steps ST16 and ST17 are then carried out for applying a protective film coating and punching for attachment of the glass master disc on a molding machine, respectively. The final step ST18 is then carried out for molding on the molding machine.

Figure 2:
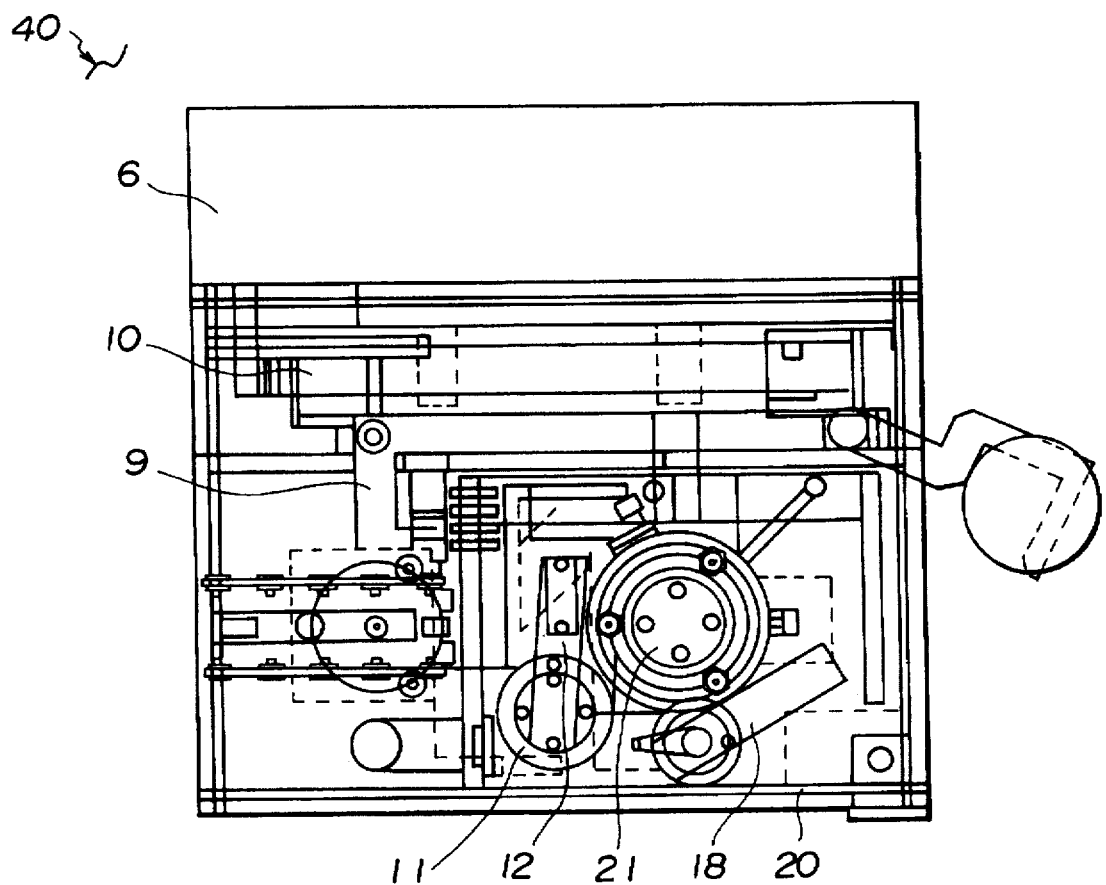
FIG. 2 is a plan view showing the grinding apparatus shown in FIG. 1, with the apparatus being partially broken away for showing the inside thereof.

In the above-described mastering process, a grinding apparatus 40 in accordance with the present invention is employed for the polishing step ST2. The grinding apparatus 40 includes an exterior assembly, a transporting unit, a polishing arm unit, a brushing unit, a washing arm unit, a turntable unit and a utility unit, as shown in FIGS. 1 and 2.

The exterior assembly includes a frame 1, an operating panel 2, a liquid crystal display 3, a tower light 4, a main switch 5 and a control panel 6. The frame 1 is a rack for attachment of respective units and is dimensioned to hold these units therein. The operating panel 2 is an actuating section for starting and stopping the grinding apparatus 40 and setting operating conditions. The liquid crystal display 3 is used to display the operating conditions and indicates any abnormal operation of the grinding apparatus 40. The tower light 4 includes three color lamps used for indicating the mode of operation of the grinding apparatus 40, such as driving or halt states. The control board 6 houses electrical components for operation of the grinding apparatus, such as a sequencer, a breaker and a motor driver.

The transporting unit is made up of a conveyor 7, a backup 8, a transfer arm 9 and a transfer arm actuator 10. The conveyor 7 serves to receive the glass master disc from a conveyor of a regenerator and is adapted for transporting the glass master disc by a driving belt (not shown). The backup 8 serves to transfer the glass master disc onto the transfer arm 9. The transfer arm 9 is used to transfer the glass master disc to a handling lifter or to a next component. The transfer arm actuator 10 has two axes of motion, namely an X-axis and a R-axis, and is adapted for driving the transfer arm 9.

The polishing arm unit includes a polishing pad 11, a polishing arm 12, a polishing arm actuator 13, a slurry nozzle 14 and a pure water discharge unit 15. The polishing pad 11 is a pad for grinding the glass master disc. The polishing pad 11 is secured to the polishing arm 12. The polishing arm actuator 13 is a driving source for vertical movement of the polishing pad 11. The slurry nozzle 14 is adapted for furnishing the grinding liquid to the glass master disc 30.

Figure 3:
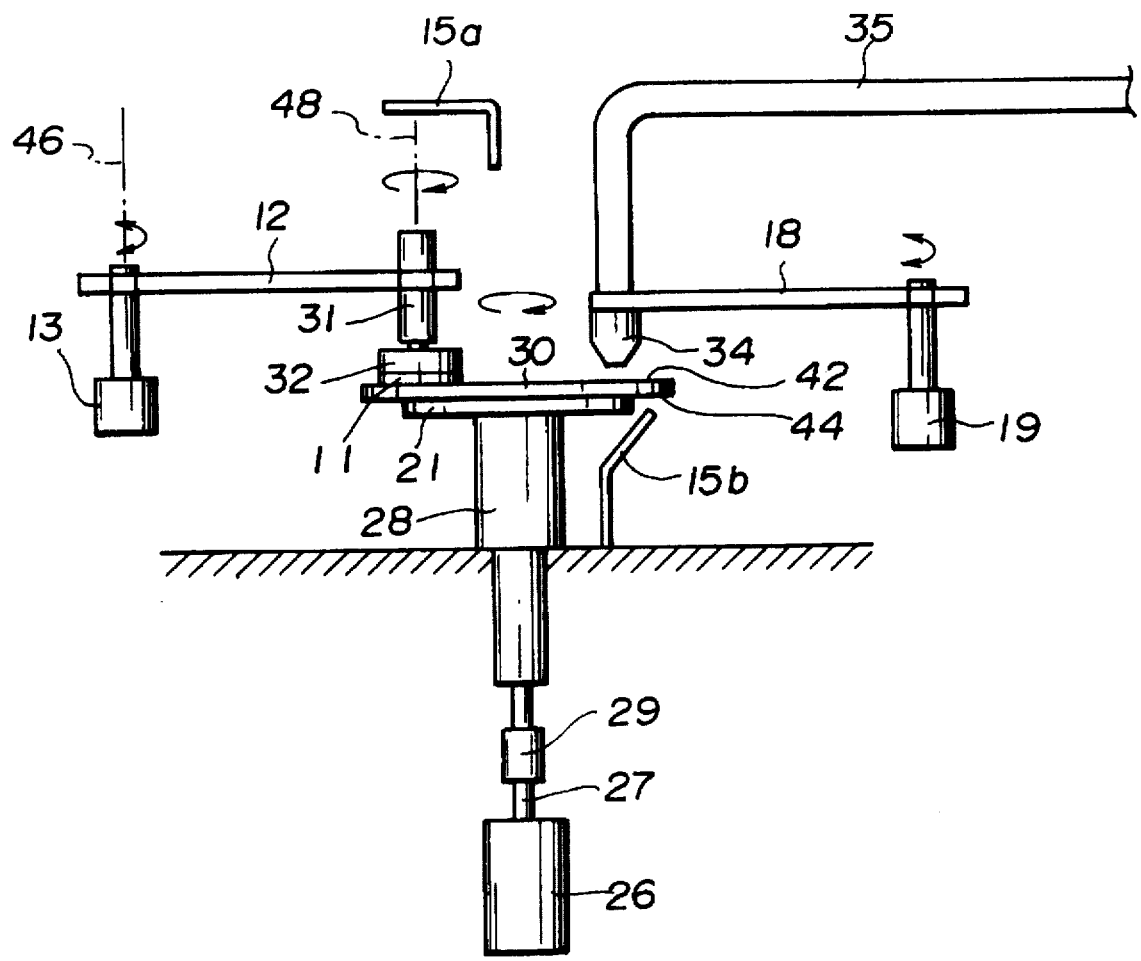
FIG. 3 is a schematic front view showing essential portions of a grinding mechanism of the grinding apparatus shown in FIG. 1.

Referring to FIG. 3, a glass master disc 30 having a top, or grinding surface 42 and an opposed back surface 44 is shown. The glass master disc 30 is oriented such that the grinding surface 42 faces upward and the back surface 44 faces downward. The pure water discharge unit 15 includes a front surface nozzle 15a. The front surface nozzle 15a serves to discharge pure water on the grinding surface 42 for wetting the grinding surface 42 before grinding and subsequent washing of the glass master disc 30 is initiated. The pure water discharge unit 15 further includes a back surface nozzle 15b positioned adjacent to the back surface 44. The back surface nozzle 15b serves to discharge pure water on the back surface 44 during grinding to prevent abrasive material from becoming affixed to the back surface 44 due to application of the grinding liquid. In a preferred embodiment, the flow rate of water discharged from the front surface nozzle 15a is approximately equal to the flow rate of water discharged from the back surface nozzle 15b.

Referring to FIGS. 1–4, the brush unit includes a pad washing brush 16 and a brush driving unit 17. The pad washing brush 16 is employed for washing the polishing pad 11. The brush driving unit 17 is a driving source for rotating the pad washing brush 16. The pad washing brush 16 is rotated in contact with the polishing pad 11 following the grinding operation in order to remove contaminants formed on the polishing pad 11 and for truing. Pad washing and truing are carried out while pure water is supplied from a pure water discharging nozzle (not shown) provided laterally of the pad washing brush 16.

The washing arm unit includes a washing arm 18 and a washing arm actuator 19. The washing arm 18 includes an ultrasonic wave generating nozzle 34 for washing the glass master disc 30. The washing arm actuator 19 serves as a driving source for driving the washing arm 18. The turntable unit includes a chamber 20, a turntable 21 and a handling lifter 22. Washing and grinding of the glass master disc 30 is performed within the chamber 20. The turntable 21 is adapted for rotating the glass master disc 30. The handling lifter 22 serves to transfer the glass master disc 30 from the transfer arm 9 to the turntable 21.

The utility unit includes a vent duct 23, a slurry tank 24 and a waste water port 25. The vent duct 23 serves as a vent port for the chamber 20 and the grinding apparatus 40. The slurry tank 24 serves to hold and supply the abrasive liquid which is continually agitated by an agitating motor (not shown). The waste waterport 25 is employed for discharging the waste slurry after grinding.

Figure 4:
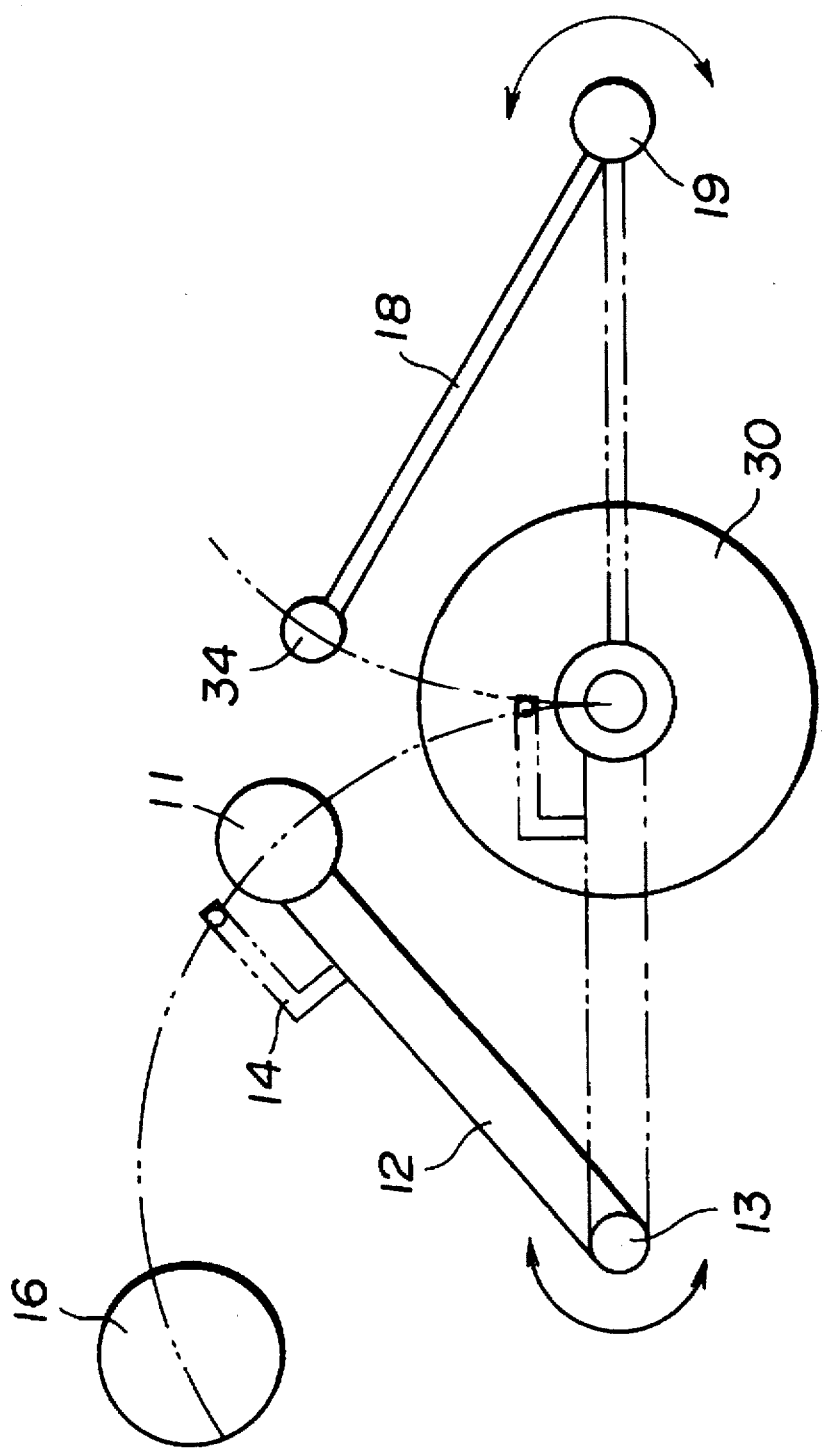
FIG. 4 is a schematic plan view showing essential portions of the grinding mechanism of the grinding apparatus shown in FIG. 1.

FIGS. 3 and 4 illustrate main portions of the grinding unit in an enlarged view. The turntable 21 is attached to a spindle 28. A driving shaft 27 of a table driving motor 26 is connected to the spindle 28 by a coupling 29. This enables the turntable 21 to be rotated by the table driving motor 26.

The turntable 21 is disc shaped and dimensioned to stably hold a single glass master disc 30 thereon, wherein the diameter of the turntable 21 is slightly smaller than the diameter of the glass master disc 30. In accordance with the present invention, the glass master disc is oriented such that the grinding surface 42 faces upwards. The turntable 21 is fitted with a vacuum suction unit (not shown) for forming a vacuum for holding the glass master disc 30 to the turntable 21.

The present apparatus is adapted for processing a single glass master disc 30 instead of simultaneously processing plural glass master discs 30. As such, for a glass disc 180 mm to 240 mm in diameter and 5 to 12 mm in thickness, the required power may be decreased, enabling the use of a smaller electric motor. This reduces power consumption and enables reduction in the size of the chamber and a corresponding reduction in size of the entire grinding apparatus 40. Further, by reduction in size of the polishing pad 11, the mandrel is sufficiently cooled with cerium and the washing pure water, so that dedicated cooling water is not needed.

A spindle 31 is rotatably mounted on the polishing arm 12. The spindle 31 includes at its distal end a disc-shaped pad holding member 32. The polishing pad 11 is bonded to the pad holding member 32. The polishing pad 11 is adapted for being rotated about a pad axis 48 by the force of friction acting between it and the grinding surface 42. Alternately, the polishing pad 11 may be rotated by a rotational driving source such as an electric motor. Further, spindle 31, the pad holding member 32, and polishing pad 11 are adapted for being rotated by the polishing actuator 13 about an actuator axis 46. In addition, the spindle 31 and the pad holding member 32 are adapted for being thrust against the glass master disc 30 at a pre-set pressure by an air supply (not shown).

Referring to FIG. 4, the pad holding member 32 and polishing pad 11 are adapted for being moved by the polishing arm actuator 13 between the glass master disc 30 and the pad washing brush 16. Thus, for grinding of the glass master disc 30, the pad holding member 32 is moved on the glass master disc 30, whereas, after grinding, the pad holding member 32 is moved over the pad washing brush 16 for washing the contaminated polishing pad 11. The pad holding member 32 is adapted to move for maintaining contact between the grinding surface 42 and the polishing pad 11 during grinding of the glass master disc 30.

The slurry nozzle 14 is mounted on the polishing arm 12 and has its distal end disposed in the vicinity of the polishing pad 11. The grinding liquid is supplied from the slurry tank 24 to the glass master disc 30 via the slurry nozzle 14. The slurry of cerium oxide is difficult to dispose of because of the extremely fine size of the cerium particles. However, since the polishing pad 11 is reduced in size, the quantity of grinding liquid that is utilized is substantially decreased, thus decreasing the amount of the waste liquid that must be disposed and the load on the waste liquid processing equipment. Further, since the entire surface of the polishing pad operates as the effective surface, it becomes possible to diminish the cerium flow rate significantly.

The front surface nozzle 15a and the back surface nozzle 15b face the grinding 42 and back 44 surfaces, respectively, of the glass master disc 30. The front surface nozzle 15a serves to wet the grinding surface 42 of the glass master disc 30 prior to start of the grinding and washing the grinding surface 42. The back surface nozzle 15b serves to spray pure water on the back surface 44 of the glass master disc 30 during grinding in order to prevent abrasive material from becoming affixed to the back surface 44 due to application of the grinding liquid. This substantially reduces the likelihood that the back surface 44 will be ground and thus damaged by the abrasive.

The distal end of the washing arm 18 includes an ultrasonic nozzle 34 adapted for being rotated by the washing arm actuator 19 for scanning the grinding surface 42 of the glass master disc 30. The ultrasonic nozzle 34 provides pure water which has been ultrasonically agitated to clean the glass master disc 30. The ultrasonic nozzle 34 is connected to a pure water supply pipe 35 which is connected to a pure water supply controller for supplying the pure water. Thus, the pure water is sprayed from the ultrasonic nozzle 34 onto the glass master disc 30.

Figure 5:
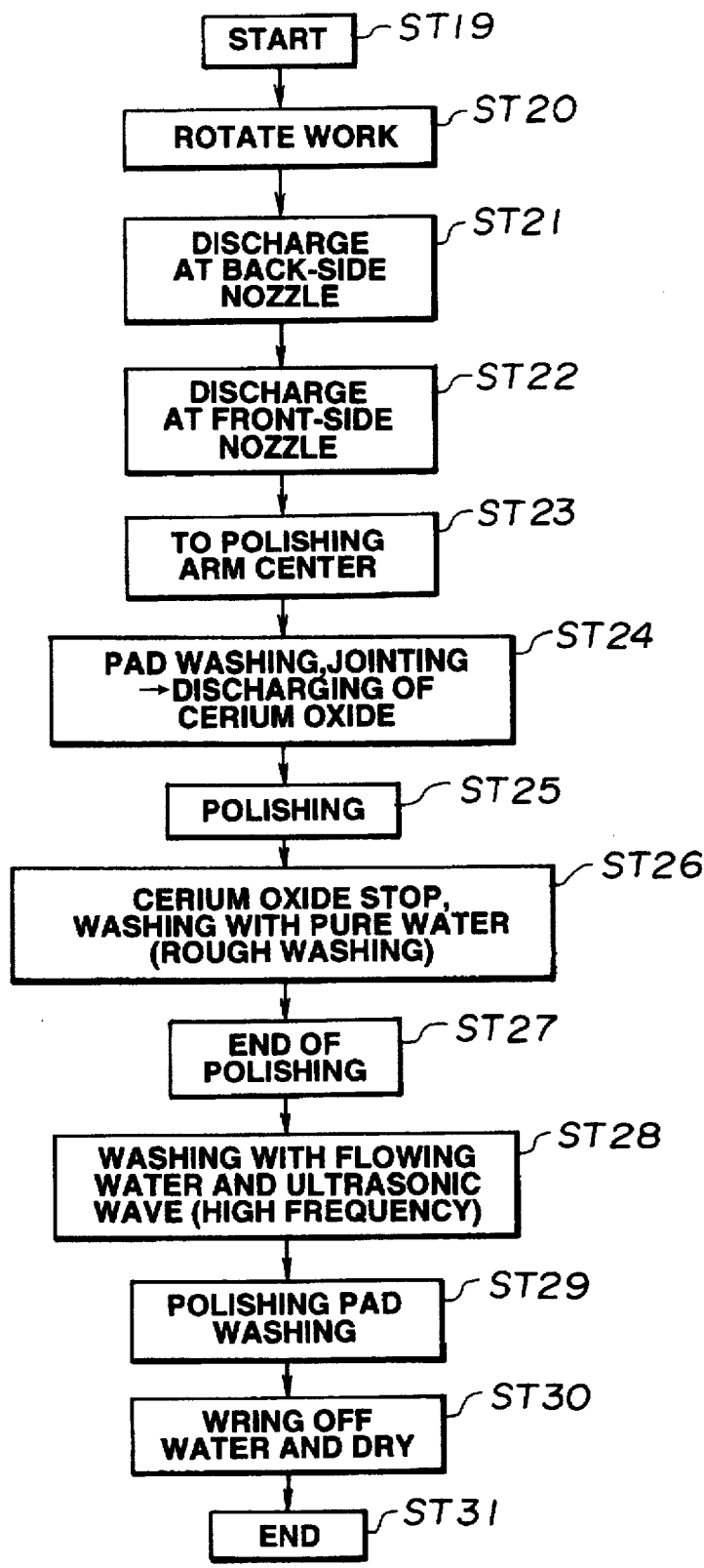
FIG. 5 is a flow chart showing the grinding process for the glass master disc using the grinding apparatus according to the present invention.

The process of grinding the glass master disc using the above-described grinding apparatus is now explained by referring to a flow chart of FIG. 5.

At step ST19, the glass master disc 30 is transported by a transporting robot, not shown, to a conveyor 7. At this time, the glass master disc 30 is transported with its grinding surface 42 facing upwards. The glass master disc 30 is transported into the mid portion of the main body of the grinding apparatus 40 by the conveyor 7 so as to be transferred by the transfer arm 9 onto the turntable 21. The glass master disc 30 set on the turntable 21 is sucked under vacuum and secured on the turntable 21.

In conventional apparatus, the orientation of the glass master disc must be changed in order to enable performance of other steps in the process, thus necessitating complicated transporting equipment. In the apparatus of this invention, the grinding surface 42 faces upward. This enables performance of other steps in the process without a change in orientation of the glass master disc, thus reducing complexity of the transporting unit used for transporting the glass master disc 30.

Then, at step ST20, the turntable 21 is rotated for rotating the glass master disc 30. At step ST21, pure water is sprayed onto the back surface 44, that is, the surface opposite to the grinding surface 42 of the glass master disc 30, by the back surface nozzle 15b. This operation is continued until termination of grinding.

Then, at step ST22, pure water is sprayed by the front surface nozzle 15a onto the grinding surface of the glass master disc 30 for wetting the grinding surface.

At step ST23, the polishing pad 11 is transported by the polishing arm 12 on the pad washing brush 16.

At step ST24, the polishing pad 11 is applied against the pad washing brush 16. Pure water is discharged via a pure water nozzle provided laterally of the brush 16, which is rotated for truing and washing of the pad.

At step ST25, the polishing pad 11 is transported on the glass master disc 30 and is caused to bear against the glass base disc 30 at a pre-set pressure by the air supply. The grinding liquid is supplied via the slurry nozzle 14 provided laterally of the polishing pad 11. The turntable 21 is rotated for grinding the glass master disc 30. The polishing pad 11 is rotated along with the glass master disc 30, due to the force of friction between it and the glass master disc 30, while the polishing pad is moved to provide contact on the grinding surface 42 as the glass master disc 30 rotates.

After the polishing is terminated at step ST26, the supply of the grinding liquid is terminated, and the grinding is continued while the pure water is supplied continuously. This rinses the abrasive material on the glass master disc 30. After termination of washing, polishing is terminated at step ST27.

Then, at step ST28, the ultrasonic nozzle 34 is scanned, as the glass master disc 30 is rotated, for ejecting pure water for washing the glass master disc 30.

At step ST29, the polishing pad 11 is caused to bear against the pad washing brush 16. While pure water is ejected via the washing nozzle provided laterally of the brush, the pad washing brush 16 is rotated for truing and washing the pad.

The glass master disc was actually ground with the aid of the above-described grinding apparatus and surface defects on the glass master disc were measured using a laser reflection surface defect measurement device. The number of defects were found to be acceptable. Also, the surface shape and signals of a stamper prepared from the glass master disc were measured. The results from these measurements indicated satisfactory values.

It will be seen from the foregoing that, with the grinding apparatus for a master disc for an optical disc according to the present invention, in which the master disc for the optical disc is secured on a turntable smaller in size than the master disc, with the grinding surface directed upwards, and in which the grinding surface is ground by an abrasive pad as the turntable is rotated and as the grinding liquid is supplied to the grinding site, the chamber and the turntable driving motor can be significantly reduced in size, while the grinding apparatus in its entirety may be rendered compact.

Further, with the present grinding apparatus for the master disc for the optical disc, since the turntable driving motor may be reduced in size, it becomes possible to diminish the required power. In addition, since there is no necessity of cooling the mandrel as required in the conventional apparatus, the consumption of utility items can be diminished. Also the consumption of the abrasive material may be significantly diminished due to the decreased abrasive pad diameter, thereby diminishing the quantity of difficultly disposable waste liquid. Furthermore, with the present grinding apparatus for the master disc for the optical disc, since the master disc may be transported with the signal surface directed upwards, work transfer and work setting on a stage may be simplified.

With the grinding apparatus for an optical disc according to the present invention, the master disc for the optical disc is secured to the turntable for rotation thereon, and is ground as the abrasive pad is applied under a pre-set pressure to the rotating grinding surface of the master disc for the optical disc and as the abrasive liquid is supplied to the grinding surface of the rotating master disc instead of bonding the abrasive pad on a rotatable mandrel and setting the master disc on the abrasive pad for grinding. Thus, the turntable is smaller in size than the master disc for the optical disc, thus rendering it possible to reduce the size of the apparatus. On the other hand, since it suffices to rotate the master disc several mm in thickness and about 22 cm in diameter, a small-sized motor suffices, thus rendering it possible to reduce the power consumption. Since the master disc is ground with the signal surface (grinding surface) directed upwards, the master disc may be transported with the signal surface directed upwards, thus simplifying work transfer and work setting on a processing stage.

What is claimed:

1. A grinding apparatus for a master disc having a grinding surface which is to be ground and a back surface which is not to be ground, comprising:
   a turntable for holding said back surface of the master disc, wherein said turntable is adapted to rotate said master disc;
   an abrasive pad thrust against said grinding surface for grinding said grinding surface, wherein said abrasive pad is thrust against said grinding surface with a pre-set pressure;
   an abrasive liquid supply unit for supplying abrasive liquid to said grinding surface, wherein grinding is carried out while supplying said grinding liquid; and
   first and second nozzles for discharging water onto said grinding and back surfaces, respectively, for washing said grinding and back surfaces, simultaneously with grinding said grinding surface.

2. The grinding apparatus as claimed in claim 1, wherein said abrasive pad is rotatably mounted with respect to a supporting member and is rotated with rotation of said master disc under the force of friction with said master disc.

3. The grinding apparatus as claimed in claim 1 wherein said abrasive pad is rotated by a rotational driving source with rotation of the master disc.

4. The grinding apparatus as claimed in claim 1 wherein said turntable is smaller in size than said master disc.

5. The grinding apparatus as claimed in claim 1 wherein said master disc is secured by vacuum suction to said turntable.

6. The grinding apparatus as claimed in claim 2 further comprising an actuator for maintaining said pre-set pressure through said supporting member.

7. The grinding apparatus as claimed in claim 2 further comprising washing means for washing the master disc.

8. A grinding apparatus for a glass master having a grinding surface which is to be ground and a back surface which is not to be ground, comprising:
   a turntable for holding said back surface;
   an abrasive pad for grinding said grinding surface;
   an abrasive liquid supply for providing abrasive liquid for grinding of said grinding surface; and
   first and second nozzles for discharging water onto said grinding and back surfaces, respectively, for washing said grinding and back surfaces to remove said grinding liquid simultaneously with grinding said grinding surface.

9. The grinding apparatus according to claim 8, further including rotating means for rotating said turntable and thus said glass master during grinding of said grinding surface.

10. The grinding apparatus according to claim 9, wherein said rotating means includes a motor.

11. The grinding apparatus according to claim 8, further including vacuum means for providing a vacuum for securing said back surface to said turntable.

12. The grinding apparatus according to claim 8, further including pressure means for maintaining a predetermined pressure on said abrasive pad.

13. A grinding apparatus for a glass master having a grinding surface and a back surface, comprising:
   a turntable for holding said back surface such that said back surface faces downward and said grinding surface faces upward, wherein said turntable is sized smaller than said glass master;
   rotating means for rotating said turntable and thus said grinding surface;
   an abrasive pad for grinding only said grinding surface;
   pressure means for maintaining a predetermined pressure on said abrasive pad during rotation of said grinding surface thus grinding said grinding surface;
   an abrasive liquid supply for providing abrasive liquid for grinding of said grinding surface, wherein a portion of said abrasive liquid accumulates on said back surface to form overflow abrasive liquid on said back surface;
   a first nozzle for discharging water onto said grinding surface for cleaning said abrasive liquid from said grinding surface; and
   a second nozzle for discharging water onto said back surface for cleaning said overflow abrasive liquid from said back surface wherein said cleaning and said grinding is being done simultaneously.

14. The grinding apparatus according to claim 13, wherein said rotating means includes a motor.

15. The grinding apparatus according to claim 13, further including vacuum means for providing a vacuum for securing said back surface to said turntable.

16. A grinding apparatus for a glass master having a grinding surface and a back surface, comprising:

a turntable for holding said back surface such that said back surface faces downward and said grinding surface faces upward;

rotating means for rotating said turntable and thus said grinding surface;

an abrasive pad for grinding only said grinding surface;

pressure means for maintaining a predetermined pressure on said abrasive pad during rotation of said grinding surface thus grinding said grinding surface;

an abrasive liquid supply for providing abrasive liquid for grinding of said grinding surface, wherein a portion of said abrasive liquid accumulates on said back surface to form overflow abrasive liquid on said back surface;

a first nozzle for discharging water onto said grinding surface for cleaning said abrasive liquid from said grinding surface;

a second nozzle for discharging water onto said back surface for cleaning said overflow abrasive liquid from said back surface; and a third nozzle for ultrasonically cleaning said grinding surface wherein said cleaning and said grinding is being done simultaneously.

17. The grinding apparatus according to claim 16, wherein said rotating means includes a motor.

18. The grinding apparatus according to claim 16, further including vacuum means for providing a vacuum for securing said back surface to said turntable.

19. The grinding apparatus according to claim 16, wherein said turntable is sized smaller than said glass master.

20. The grinding apparatus according to claim 16, further including pad washing means for washing said abrasive pad.

21. The grinding apparatus according to claim 20, wherein said pad washing means include a pad washing brush for cleaning said abrasive pad.

22. The grinding apparatus according to claim 21, wherein said pad washing means include moveable arm means for moving said abrasive pad to said pad washing brush for cleaning said abrasive pad.

23. The grinding apparatus according to claim 22, wherein said moveable arm means include an actuator.

* * * * *